(12) United States Patent
Singh

(10) Patent No.: US 11,052,923 B2
(45) Date of Patent: Jul. 6, 2021

(54) VEHICLE INTERFACE APPARATUS AND METHOD

(71) Applicant: Jaguar Land Rover Limited, Coventry (GB)

(72) Inventor: Harpreet Singh, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 307 days.

(21) Appl. No.: 15/748,510

(22) PCT Filed: Sep. 9, 2016

(86) PCT No.: PCT/EP2016/071249
§ 371 (c)(1),
(2) Date: Jan. 29, 2018

(87) PCT Pub. No.: WO2017/050590
PCT Pub. Date: Mar. 30, 2017

(65) Prior Publication Data
US 2018/0222493 A1 Aug. 9, 2018

(30) Foreign Application Priority Data

Sep. 21, 2015 (GB) ..................................... 1516684

(51) Int. Cl.
*B60W 50/16* (2020.01)
*B60W 50/00* (2006.01)
(Continued)

(52) U.S. Cl.
CPC ........ *B60W 50/16* (2013.01); *B60W 50/0097* (2013.01); *B60W 50/10* (2013.01);
(Continued)

(58) Field of Classification Search
None
See application file for complete search history.

(56) References Cited

U.S. PATENT DOCUMENTS

2007/0182529 A1 8/2007 Dobler et al.
2012/0174111 A1 7/2012 Pala et al.
(Continued)

FOREIGN PATENT DOCUMENTS

DE   10 2011 111 213 A1   2/2013
EP        1 930 201 A1   6/2008
WO   WO 2015/165811 A1  11/2015

OTHER PUBLICATIONS

Patents Act 1977: Combined Search and Examination Report under Sections 17 and 18(3), UKIPO Application No. GB1516684.6, dated Mar. 18, 2016, 7 pp.

(Continued)

*Primary Examiner* — Richard M Camby
(74) *Attorney, Agent, or Firm* — McCoy Russell LLP

(57) ABSTRACT

The present disclosure relates to a human machine interface (1) for a vehicle (2). The human machine interface (1) includes a first output device (10) for outputting information relating to a vehicle system (VS). The human machine interface (1) includes a controller (3) having at least one processor (4) having an input for receiving a driver status signal ($D_{STAT}$). A memory device (5) is coupled to the at least one processor (4) and has instructions stored therein. The at least one processor (4) is configured to determine an operating state of said vehicle system (VS) and to control said first output device (10) to output information relating to the determined operating state. The at least one processor (4) is configured to compose the information to be output in dependence on the received driver status signal ($D_{STAT}$). The present disclosure also relates to a method of controlling the output of information relating to an operating state of a vehicle system (VS).

18 Claims, 3 Drawing Sheets

(51) Int. Cl.
*B60W 50/14* (2020.01)
*B60W 50/10* (2012.01)

(52) U.S. Cl.
CPC ..... *B60W 50/14* (2013.01); *B60W 2050/0089* (2013.01); *B60W 2050/146* (2013.01); *B60W 2540/22* (2013.01); *B60W 2540/30* (2013.01)

(56) References Cited

U.S. PATENT DOCUMENTS

| | | |
|---|---|---|
| 2013/0049943 A1 | 2/2013 | Wendt et al. |
| 2014/0300479 A1 | 10/2014 | Wolter et al. |
| 2015/0066282 A1 | 3/2015 | Yopp |
| 2018/0239424 A1* | 8/2018 | Nishihashi .............. B60R 16/02 |
| 2018/0244277 A1* | 8/2018 | Yoshitomi ............. B60W 40/04 |
| 2018/0244279 A1* | 8/2018 | Kochhar ............... B60W 30/08 |

OTHER PUBLICATIONS

International Search Report and Written Opinion of the International Searching Authority, International Application No. PCT/EP2016/071249, dated Dec. 9, 2016, 15 pp.

* cited by examiner (FIG. 2 continued on page 3)

| User response | Example Personality Modal |
|---|---|
| Audio response | Audio interface |
| Visual response | Visual information<br>Gaze time can be used to identify most used interfaces |
| Gesture response | Visual |
| Formal/Informal language response | Change message settings to be formal or informal in accordance with user response |

FIG. 2
(FIG. 2 continued from page 2)

VEHICLE INTERFACE APPARATUS AND METHOD

RELATED APPLICATIONS

This application is a 35 U.S.C. § 371 national stage application of PCT Application No. PCT/EP2016/071249, filed on Sep. 9, 2016, which claims priority from Great Britain Patent Application No. 1516684.6, filed on Sep. 21, 2015, the contents of which are incorporated herein by reference in their entireties. The above-referenced PCT International Application was published in the English language as International Publication No. WO 2017/050590 A1 on Mar. 30, 2017.

TECHNICAL FIELD

The present disclosure relates to a vehicle interface apparatus and method. More particularly, but not exclusively, the present disclosure relates to a human machine interface and method for composing information to be output to a driver of a vehicle. Aspects of the invention relate to a human machine interface, to a method, and to a vehicle.

BACKGROUND

Traditional human machine interaction in a vehicle is started by the user, typically a driver of the vehicle. Information may be output to the user in a variety of forms, for example audio, visual and haptic output. The nature and dialogue presented by known human machine interfaces is static and does not take account of external factors, such as the driver's mood, personality, workload etc. This limitation in the human machine interface may restrict how the driver perceives and accepts the information.

It is against this background that the present invention has been conceived. At least in certain embodiments, the present invention seeks to overcome or ameliorate at least some of the shortcomings of prior art interfaces.

SUMMARY OF THE INVENTION

Aspects and embodiments of the present invention provide a human machine interface, a method and a vehicle as claimed in the appended claims.

According to an aspect of the present invention there is provided a human machine interface for a vehicle, the human machine interface comprising:
  a first output device for outputting information relating to a vehicle system;
  a controller comprising at least one processor having an input for receiving a driver status signal; and
  a memory device coupled to the at least one processor and having instructions stored therein;
  the at least one processor being configured to determine at least one of a plurality of operating states of said vehicle system and to control said first output device to output information relating to the determined operating state;
  wherein the at least one processor is configured to compose the information to be output in dependence on the received driver status signal. The at least one processor may implement a dialogue manager to control the output of information at any given time. The driver status signal provides a measure of the driver status. By monitoring the driver status, the human machine interface may provide a dynamic dialogue manager which responds to driver behaviour. The at least one processor may vary the content and/or structure and/or amount (quantity) of said information in dependence on said driver status signal. The driver status signal may be determined in dependence on one or more of the following: driving conditions, driver personality, historic data to understand driver personality and/or preferences, current driver tasks, predicted driver workload or tasks (for example based on detection of approaching traffic; and/or identification of road junctions or roundabouts) and surrounding conditions. The human machine interface thereby presents information in a manner which is readily comprehensible to the driver of the vehicle.

The human machine interface typically initiates communication with a driver of the vehicle upon detection of an important event relating to a vehicle system. For example, if the at least one processor determines that the vehicle system is not operating correctly, for example a fault or error has developed, information relating to the determined operating state of the vehicle system can be output to the driver. It is envisaged that the human machine interface could be implemented in a system which allows the driver to initiate a dialogue to obtain more information about an event or to discuss a topic of interest in more detail. The at least one processor may learn from historic driver behaviour and responses to different amounts of information in order to understand driver preferences, driver personality and to update the information structure to give information in the most efficient manner. The human machine interface may determine and implement the strategy which results in the least user effort in understanding the information. The at least one processor may assess user effort by monitoring vehicle operating parameters and/or driver behaviour after outputting information. The human machine interface may have a set amount of information to convey to the driver, but may adopt different strategies to output that information depending on the driver status signal. For example, the at least one processor may present the information in a large number of small blocks; or may present the information in a small number of large blocks. Equally, the human machine interface may apply different questioning strategies, for example a direct question or a detailed question with reasoning.

The at least one processor may predict driver workload by considering navigation and/or surrounding conditions to vary the content displayed (e.g. to reduce or limit the output of information when a high driver workload is predicted). The at least one processor may also learn the driver mood in certain driving conditions, for example by monitoring a driver response to an output from the human machine interface. The driver monitoring could, for example, be performed using biosensors. The current external driving conditions may be monitored to understand what type of dialogue structure is preferred for a given driver mood. Consequently, the human machine interface may change the future dialogue content and/or structure based upon the driver mood.

The at least one processor may also learn from the driver response how fast they can read the information. The at least one processor may manage the content and/or amount of information output to the driver. This change in information content based upon driver personality may help the human machine interface to reduce or minimise driver workload.

The at least one processor may be configured to control said first output device to modify the information output by said first output device relating to said first operating state of the vehicle system in dependence on said driver status signal.

The information relating to each operating state of the vehicle system may be defined by a plurality of data packets; and the at least one processor may be configured to compose the information to be output by selecting one or more of said data packets in dependence on said driver status signal. Each data packet may relate to a particular aspect of the operating state of the vehicle system. Thus, the data packets may each consist of a sub-set of the available data defining the operating state of the vehicle system. The at least one processor may be configured to compose the information to be output by selecting one or more of said data packets for output. The at least one processor may also compose the information to be output by selecting the sequence in which two or more of said data packets are output. The at least one processor may control when one or more of said data packets is output.

The first output device may be a display screen, such as a liquid crystal display (LCD). The display screen may be disposed in a centre console of a vehicle, or in an instrument cluster. Alternatively, the display screen may project an image to form a Head Up Display (HUD). A first data packet may comprise a graphical element representing the vehicle system; and/or a second data packet may comprise a numerical value relating to the vehicle system; and/or a third data packet may comprise a statement or message relating to the vehicle system.

The first output device may be an audio output device, such as one or more loud speakers. A first data packet may comprise an audible notification, such as an audible tone; and/or a second data packet may comprise a first audio message relating to the vehicle system; and/or a third data packet may comprise a second audio message relating to the vehicle system. The at least one processor may compose the information by selecting one or more of said data packets for output.

The information relating to each operating state of the vehicle system may be defined in a plurality of different formats for output by said first output device.

The information to be output may be composed by selecting the format of the information to be output by said first output device. The format of the information can, for example, comprise a graphical symbol representing the vehicle system; or a text statement or sentence identifying the vehicle system and the operating state.

The at least one processor may be configured to monitor the driver status signal after the information is output by said first output device; and may re-compose the information in dependence on a detected change in the driver status signal. The at least one processor may modify the information to be output by the first output device in dependence on a detected change in the driver status signal. The human machine interface may store data relating to a driver response in order to establish a database of driver behaviour. The data may, for example, be stored in said memory device. The at least one processor may be configured to control said first output device to output the re-composed information following the detected change in the driver status.

The at least one processor may be configured to store a set of driver preferences in dependence on the detected change in the driver status signal.

The driver status signal may provide an indication of one or more of the following: driver drowsiness; driver distraction; driver alertness; driver annoyance; driver response time; driver workload; driver cognition; driver puzzlement; driver understanding; driver reaction time; and driver physical condition. The driver physical condition may be measured through heart rate, breathing rate, etc. The driver attention may be monitored to assess the driver cognition.

The first output device may be a visual output device; an audio output device; or a haptic output device.

The human machine interface may compose the information to be output in dependence on driver condition and/or historic data and/or surrounding conditions. The at least one processor may be configured to receive the driver status signal from a driver monitoring system. The driver monitoring system may be incorporated into a workload manager and/or a personality model.

The driver monitoring system may comprise a driver-facing camera. The driver behaviour may be determined by an image processor configured to analyse image data generated by said driver-facing camera. The driver monitoring system may determine the driver status in dependence on one or more vehicle operating parameters, for example dynamic operation of the vehicle. Alternatively, or in addition, the driver monitoring system may be coupled to one or more biometric sensors, such as a heart rate sensor and/or a temperature sensor (such as an infra-red camera).

The human machine interface may comprise a second vehicle output device, wherein the at least one processor is configured to control said second output device to output information relating to the determined operating state; the at least one processor being configured to compose the information to be output by said second output device in dependence on the received driver status signal. The at least one processor may be configured to control said first and second vehicle output devices to output different information, for example by changing the content of the information.

According to a further aspect of the present invention there is provided a vehicle comprising a human machine interface as described herein.

According to a further aspect of the present invention there is provided a method of controlling the output of information relating to a vehicle system, the method comprising:
  determining a driver status;
  determining at least one of a plurality of operating states of the vehicle system; and
  outputting information relating to the determined operating state of the vehicle system from a first output device;
  wherein the information is composed in dependence on the determined driver status.

The method may comprise composing the information to be output by selecting one or more data packets in dependence on the determined driver status.

The method may comprise composing the information to be output by selecting one or more different formats of the information to be output by said first output device. The method may comprise composing the information to be output by selecting the format of the information to be output by said first output device.

The method may comprise monitoring the driver status after the information is output by said first output device; and re-composing the information in dependence on a detected change in the driver status. The method may comprise modifying the information to be output by the first output device in dependence on a detected change in the driver status. The method may comprise outputting the re-composed information following the detected change in the driver status.

The method may comprise storing a set of driver preferences in dependence on the detected change in the driver status.

The driver status may comprise one or more of the following: driver drowsiness; driver distraction; driver alertness; driver annoyance; driver response time; driver workload; driver cognition; driver puzzlement; driver understanding; driver reaction time; and driver physical condition.

The first output device may be a visual output device; an audio output device; or a haptic output device.

The method may comprise using a driver monitoring system to determine the driver status. The driver monitoring system may be incorporated into a workload manager or a personality model.

The method may comprise controlling the output of said information relating to the determined operating state to a second output device. The method may comprise composing the information to be output by said second output device in dependence on the determined driver status.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
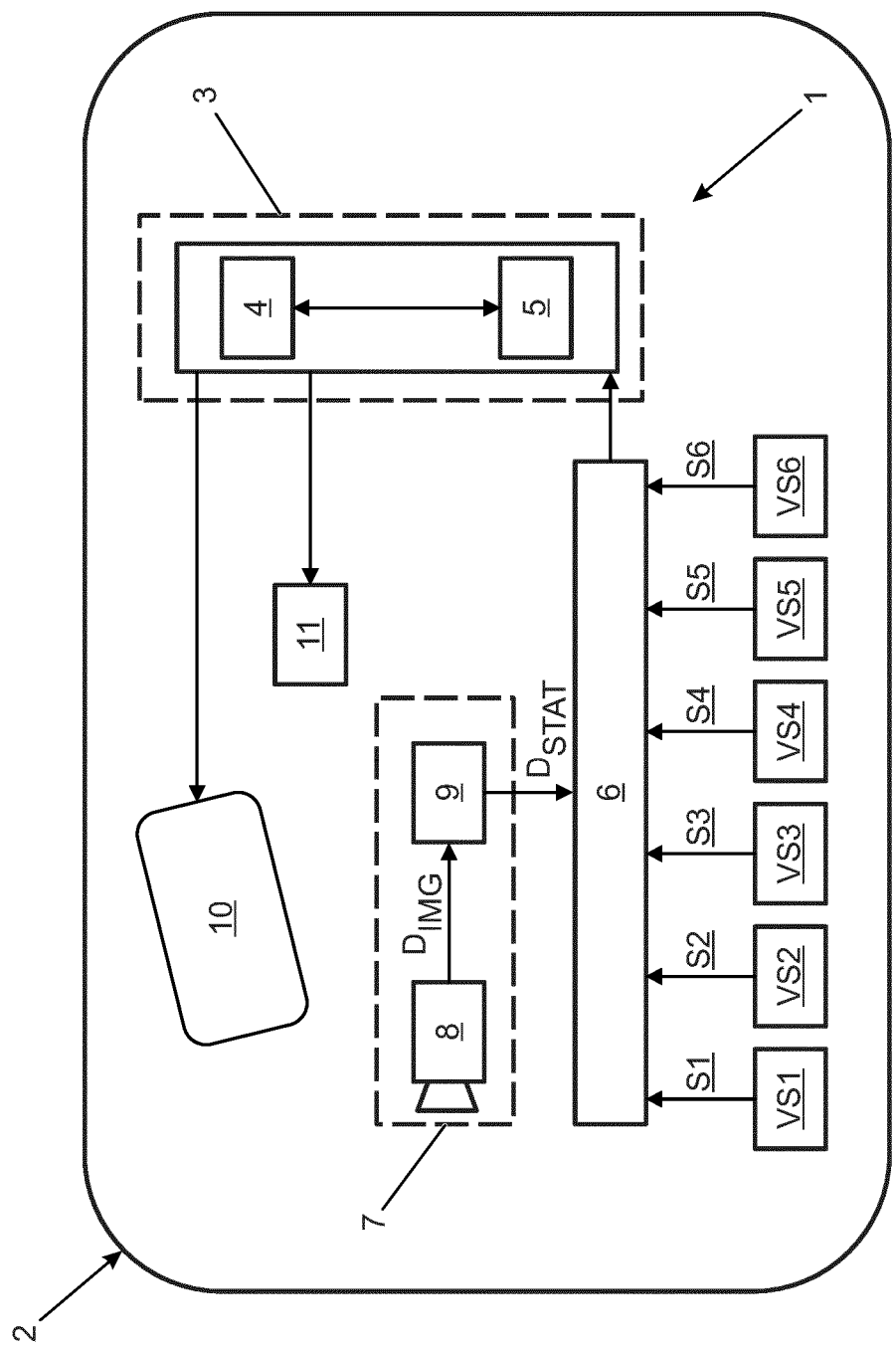
FIG. 1 shows a schematic representation of a vehicle comprising a human machine interface in accordance with an embodiment of the present invention.

A human machine interface 1 in accordance with an embodiment of the present invention will now be described with reference to the accompanying figures. The human machine interface 1 is disposed in a vehicle 2. In the present embodiment, the vehicle 2 is an automobile, but the invention is not limited in this respect.

The human machine interface 1 comprises a controller 3 having an electronic processor 4 and a memory device 5. A set of computational instructions is stored on the memory device 5. When executed, the computational instructions cause the electronic processor 4 to implement the method(s) described herein.

The electronic processor 4 is coupled to a vehicle communication bus 6, such as a CAN communication bus. The vehicle communication bus 6 is connected to a plurality of vehicle systems (denoted generally by the reference numeral VS in FIG. 1) disposed on the vehicle 2. The vehicle systems VS include: an engine management system VS1, a brake management system VS2, a fuel monitoring system VS3, a tyre pressure monitoring system VS4, a vehicle navigation system VS5, a traffic monitoring system VS6. It will be understood that this is a non-exhaustive list of vehicle systems VS suitable for use in conjunction with the human machine interface 1 described herein. The vehicle systems VS publish data signals S to the vehicle communication bus 6. The data signals S each comprise one or more data packets relating to the operating state of the corresponding vehicle systems VS. At least some of the information published to the vehicle communication bus 6 is selectively output to a driver of the vehicle 2. By way of example, the tyre pressure monitoring system VS4 may detect a drop in tyre pressure which may indicate that the tyre has developed a puncture. The tyre pressure monitoring system VS4 publishes a signal S4 to the vehicle communication bus 6 which prompts the human machine interface 1 to output corresponding tyre pressure information. The signal S4 would typically indicate the affected tyre and may also comprise a measured tyre pressure. The human machine interface 1 controls the output of information derived from the signal S4.

As described herein, the controller 3 implements a dialogue manager configured to compose information to be output to the driver. In particular, the human machine interface 1 composes the information to be output in dependence on the status of the driver at that time. The human machine interface 1 selects one or more data packets included in the data signals S to compose the information. The dialogue manager may also control the output of information, for example to control the timing at which a message or notification is output. The controller 3 is configured to receive a driver status signal $D_{STAT}$ from a driver monitoring system 7. The driver monitoring system 7 comprises a driver-facing camera 8 and an image processor 9. The driver-facing camera 8 in the present embodiment is an optical digital camera operative to generate digital image data DIMG. The digital image data DIMG is analysed by the image processor 9 to identify and categorize driver behaviour. The image processor 9 may, for example, determine a gaze direction and/or a gaze duration of the driver. The image processor 9 may also identify one or more gestures performed by the driver to assess driver behaviour. The image processor 9 may categorize one or more of the following driver characteristics: driver drowsiness; driver distraction; driver alertness; driver annoyance; driver response time; and driver workload. It will be understood that this list is non-exhaustive and other driver characteristics may be monitored and categorized. The driver monitoring system 7 may also comprise one or more biometric sensors (not shown) and/or an audio input device (not shown), such as a microphone, to monitor and characterise driver behaviour. The audio input device may be implemented in an audio interface system, for example performing speech recognition functions. By monitoring driver inputs and/or responses to the audio input device, the driver monitoring system 7 may categorise driver behaviour.

The image processor 9 categorises the driver behaviour and generates the driver status signal $D_{STAT}$ in dependence on said categorisation. The driver status signal $D_{STAT}$ is published to the vehicle communication bus 6. Alternatively, or in addition, the driver status signal $D_{STAT}$ may be generated in dependence on data received from other vehicle systems, for example utilising the vehicle speed and/or steering angle and/or navigation data to determine a driver workload.

The human machine interface 1 comprises a first output device 10 and a second output device 11. In the present embodiment the first output device 10 is in the form of a display screen, for example disposed in an instrument cluster or a centre console (not shown) of the vehicle 2; and the second output device 11 is in the form of an audio output device, such as a loudspeaker, disposed in the cabin of the vehicle 2. The controller 3 is configured to control the output of information from said first and second output devices 10, 11 in dependence on the driver status signal $D_{STAT}$. The information relating to each operating state of the vehicle system is defined by the data packets published to the communication bus 6 by the vehicle systems VS. The electronic processor 4 is configured to compose the information to be output by selecting one or more of said data packets in dependence on said driver status signal $D_{STAT}$. In the above example, the tyre pressure monitoring system VS4 publishes a signal S4 to the vehicle communication bus 6. The signal S4 comprises a first data packet which indicates which tyre is subject to a pressure drop; and a second data packet comprises the measured tyre pressure. By way of example, the tyre pressure monitoring system VS4 may detect a drop in tyre pressure which may indicate that the tyre has developed a puncture. The tyre pressure monitoring system VS4 publishes a signal S4 to the vehicle communication bus 6 which prompts the human machine interface 1 to output corresponding tyre pressure information. The signal S4 may comprise a first data packet indicating the affected tyre and a second data packet specifying a measured tyre pressure. The human machine interface 1 composes the information to be output to the driver of the vehicle 2 by selecting said first data packet and/or said second data packet. The human machine interface 1 outputs said first data packet and/or said second data packet to said first output device 10 and/or said second output device 11.

Figure 2:
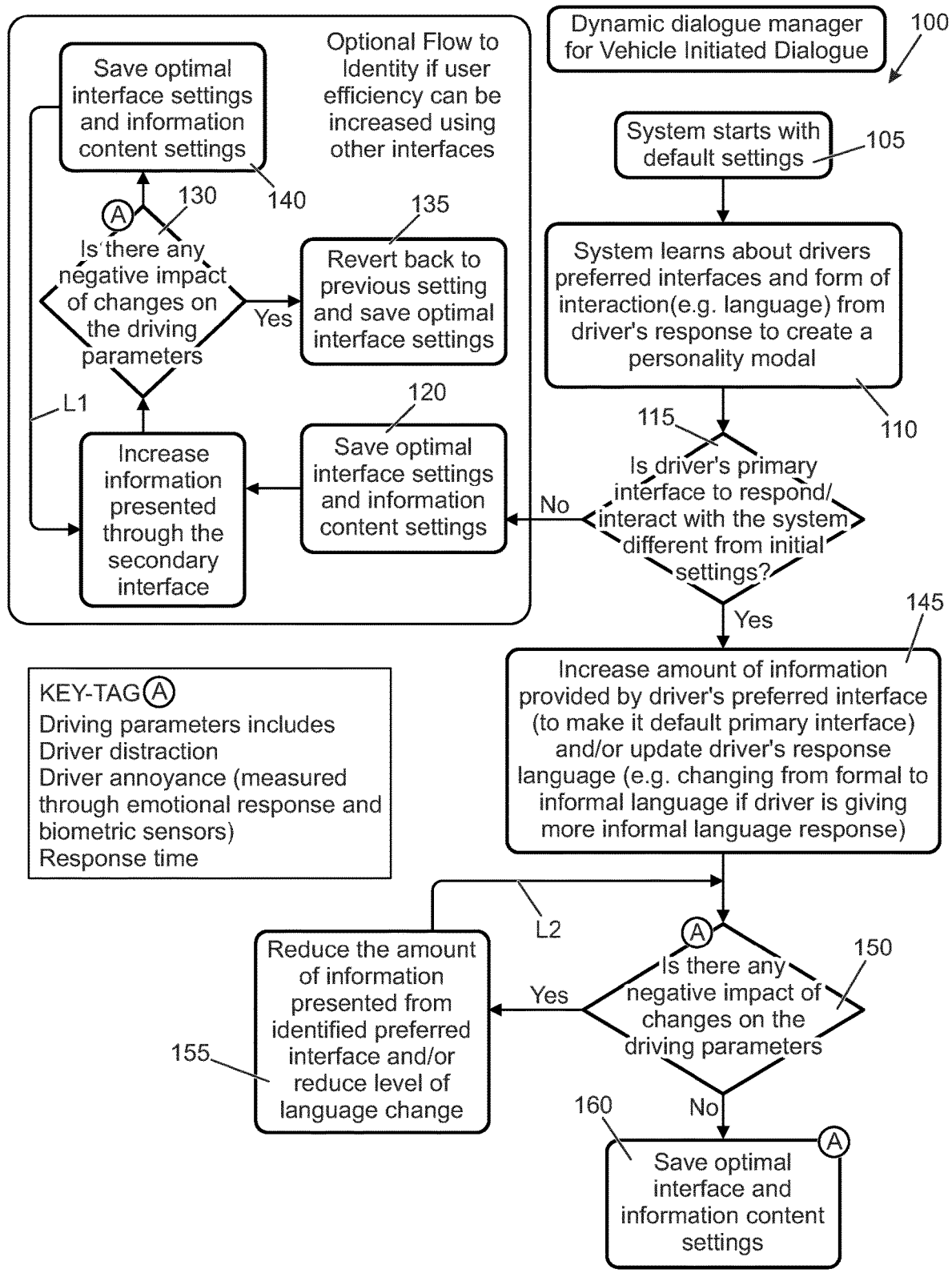
FIG. 2 is a flowchart representing operation of the human machine interface shown in FIG. 1.

The operation of the human machine interface 1 will now be described with reference to a block diagram 100 shown in FIG. 2. The human machine interface 1 is started with default settings (STEP 105). The human machine interface 1 determines driver preferences, for example a preferred interface and/or form of interaction (for example, language). The driver preferences can be learned from driver responses to create a personality model (STEP 110). A check is then performed to determine if the primary interface selected by the driver to respond/interact with the human machine interface 1 differs from the initial system settings (STEP 115).

If the driver selects a primary interface which is the same as the initial system settings, a sub-routine is optionally implemented to determine if the user efficiency can be increased using other interfaces. The optimal interface settings and information content settings are saved (STEP 120). The information presented through a secondary interface is then increased (STEP 125). A check is then performed to determine if the additional information adversely influences driving parameters (STEP 130). The driving parameters can, for example, include driver distraction, driver annoyance (measured through emotional response and biometric sensors) and response time. If the driving parameters are adversely affected, the human machine interface 1 reverts to the previous settings and saves the optimal interface settings (STEP 135). If the driving parameters are not adversely affected, the revised settings are saved as the optimal interface settings and information content settings (STEP 140). A first loop L1 can be implemented to check if additional information can be presented (STEP 125).

If the driver selects a different primary interface which is not the same as the initial system settings, the amount of information presented by the driver's preferred interface is increased and made a default primary interface (STEP 145). Alternatively, or in addition, the response language is updated, for example to change style from formal to informal language to reflect driver response. A check is then performed to determine if the additional information adversely influences driving parameters (STEP 150). The driving parameters can, for example, include driver distraction, driver annoyance (measured through emotional response and biometric sensors) and response time. If the driving parameters are adversely affected, the human machine interface 1 reduces the amount of information presented from the selected preferred interface and/or reduces the level of language change (STEP 155). A second loop L2 is implemented to check if the reduction in the amount of information adversely influences driving parameters. When the human machine interface 1 determines that the interface and information content settings are at an optimum level, the settings are saved for future reference (STEP 160).

It will be appreciated that various changes and modifications can be made to the human machine interface 1 described herein without departing from the scope of the present application.

The human machine interface 1 may optionally be configured to predict the status of the driver and compose the information to be output in dependence on the predicted status. The human machine interface 1 may, for example, communicate with a navigation system to identify approaching road junctions and/or roundabouts that would increase driver workload. Alternatively, or in addition, the human machine interface 1 may monitor traffic levels to estimate driver workload.

The invention claimed is:

1. A human machine interface for a vehicle, the human machine interface comprising:
    a first output device for outputting information relating to a vehicle system;
    a controller comprising at least one processor having an input for receiving a driver status signal; and
    a memory device coupled to the at least one processor and having instructions stored therein;
    the at least one processor being configured to determine at least one of a plurality of operating states of the vehicle system and to control the first output device to output information relating to the determined at least one of a plurality of operating states;
    wherein the at least one processor is configured to compose the information to be output in dependence on the received driver status signal, to monitor the driver status signal after the information is output by the first output device, to re-compose the information in dependence on a detected change in the driver status signal, to output the re-composed information following the detected change in the driver status, and to store a set of driver preferences in dependence on the detected change in the driver status.

2. The human machine interface as claimed in claim 1, wherein the information relating to the at least one of a plurality of operating states of the vehicle system is defined by a plurality of data packets; and wherein the at least one processor is configured to compose the information to be output by selecting one or more of the data packets in dependence on the driver status signal.

3. The human machine interface as claimed in claim 1, wherein the information relating to the at least one of a plurality of operating states of the vehicle system is defined in a plurality of different formats for output by the first output device.

4. The human machine interface as claimed in claim 1, wherein the at least one processor is configured to modify the information to be output by the first output device in dependence on the detected change in the driver status signal.

5. The human machine interface as claimed in claim 1, wherein the at least one processor is configured to control the first output device to output the re-composed information following the detected change in the driver status.

6. A human machine interface for a vehicle, the human machine interface comprising:
a first output device for outputting information relating to a vehicle system;
a controller comprising at least one processor having an input for receiving a driver status signal; and
a memory device coupled to the at least one processor and having instructions stored therein;
the at least one processor being configured to determine at least one of a plurality of operating states of the vehicle system and to control the first output device to output information relating to the determined at least one of a plurality of operating states;
wherein the at least one processor is configured to compose the information to be output in dependence on the received driver status signal, to monitor the driver status signal after the information is output by the first output device, to re-compose the information in dependence on a detected change in the driver status signal, and to modify the information to be output by the first output device in dependence on the detected change in the driver status signal;
wherein the at least one processor is configured to store a set of driver preferences in dependence on the detected change in the driver status signal.

7. The human machine interface as claimed in claim 1, wherein the driver status signal provides an indication of one or more of the following: driver drowsiness; driver distraction; driver alertness; driver annoyance; driver response time; driver workload; driver cognition; driver puzzlement; driver understanding; driver reaction time; and driver physical condition.

8. The human machine interface as claimed in claim 1, wherein the first output device is a visual output device; or an audio output device; or a haptic output device.

9. The human machine interface as claimed in claim 1, wherein the at least one processor is configured to receive the driver status signal from a driver monitoring system.

10. The human machine interface as claimed in claim 1, further comprising a second vehicle output device; wherein the at least one processor is configured to control the second vehicle output device to output information relating to the determined at least one of a plurality of operating states; and wherein the at least one processor is configured to compose the information to be output by the second vehicle output device in dependence on the received driver status signal.

11. A vehicle comprising a human machine interface as claimed in claim 1.

12. A method of controlling the output of information relating to a vehicle system, the method comprising:
determining a driver status;
determining at least one of a plurality of operating states of the vehicle system;
outputting information relating to the determined at least one of a plurality of operating states of the vehicle system from a first output device;
wherein the information is composed in dependence on the determined driver status, wherein the driver status is monitored after the information is output by the first output device, and wherein the information is re-composed in dependence on a detected change in the driver status;
outputting the re-composed information following the detected change in the driver status; and
storing a set of driver preferences in dependence on the detected change in the driver status.

13. The method as claimed in claim 12, wherein composing the information to be output comprises selecting one or more data packets in dependence on the determined driver status.

14. The method as claimed in claim 12, wherein composing the information to be output comprises selecting one or more different formats of the information to be output by the first output device.

15. The method as claimed in claim 12, wherein the driver status comprises one or more of the following: driver drowsiness; driver distraction; driver alertness; driver annoyance; driver response time; driver workload; driver cognition; driver puzzlement; driver understanding; driver reaction time; and driver physical condition.

16. The method as claimed in claim 12, wherein the first output device is a visual output device; or an audio output device; or a haptic output device.

17. The method as claimed in claim 12, further comprising using a driver monitoring system to determine the driver status.

18. The method as claimed in claim 12, further comprising: controlling the output of the information relating to the determined at least one of a plurality of operating states to a second output device; and composing the information to be output by the second output device in dependence on the determined driver status.

* * * * *